(12) United States Patent
Hórvölgyi et al.

(10) Patent No.: US 11,029,514 B2
(45) Date of Patent: Jun. 8, 2021

(54) ANTIREFLECTION FILM AND ITS USE ON A SUBSTRATE

(71) Applicant: Hungaro Lux Light Kft., Budapest (HU)

(72) Inventors: Zoltán Hórvölgyi, Budapest (HU); Emöke Albert, Budapest (HU); Lenke Kócs, Piliscaba (HU); Csaba Ferenc Major, Eger (HU); Jánosné Kabai, Budapest (HU)

(73) Assignee: HUNGARO LUX LIGHT KFT., Budapest (HU)

( * ) Notice: Subject to any disclaimer, the term of this patent is extended or adjusted under 35 U.S.C. 154(b) by 14 days.

(21) Appl. No.: 16/310,112

(22) PCT Filed: Jun. 15, 2017

(86) PCT No.: PCT/HU2017/050023
§ 371 (c)(1),
(2) Date: Dec. 14, 2018

(87) PCT Pub. No.: WO2017/216592
PCT Pub. Date: Dec. 21, 2017

(65) Prior Publication Data
US 2019/0177553 A1    Jun. 13, 2019

(30) Foreign Application Priority Data
Jun. 15, 2016   (HU) .................... P1600384

(51) Int. Cl.
*G02B 27/00* (2006.01)
*G02B 1/11* (2015.01)
(Continued)

(52) U.S. Cl.
CPC ............... *G02B 27/00* (2013.01); *G02B 1/11* (2013.01); *C03C 17/004* (2013.01);
(Continued)

(58) Field of Classification Search
CPC .. G02B 1/118; G02B 1/11; G02B 1/04; G02B 1/115; G02B 1/10; G02B 1/0221;
(Continued)

(56) References Cited

U.S. PATENT DOCUMENTS

| 8,591,026 B2 * | 11/2013 | Conte | G02C 7/02 |
| | | | 351/159.57 |
| 8,846,140 B2 * | 9/2014 | Roisin | G02B 1/115 |
| | | | 427/164 |
| 9,772,509 B2 * | 9/2017 | Bolshakov | G02B 1/11 |

FOREIGN PATENT DOCUMENTS

| CA | 3028375 | 12/2017 |
| CN | 102222704 | 10/2011 |

(Continued)

OTHER PUBLICATIONS

Brinker, J.C.; "Dip Coating" included in the textbook of Chemical Solution Deposition of Functional Oxide Thin Films (editors: T. Schneller, R. Waser, M. Kosec, D. Payne; publisher: Springer Vienna; published in 2013; ISBN 978-3-211-99310-1).

(Continued)

*Primary Examiner* — Darryl J Collins
*Assistant Examiner* — Tamara Y. Washington
(74) *Attorney, Agent, or Firm* — Fitch, Even, Tabin & Flannery LLP (57) ABSTRACT

This disclosure relates to an antireflection film, as well as its use on a substrate (3) to decrease a fracture of light striking the substrate (3) reflected by said substrate (3), wherein said coating is formed of a transparent first layer (1) applied on the substrate (3) and a transparent second layer (2) on said first layer (1). The essence of the solutions according to this disclosure is that thickness ($d_1$) of the first layer (1) ranges from 10 to 70 nm and refractive index ($n_1$) of said first layer (1) satisfies the relation $1.05<n_1<1.35$ within the wavelength range of 375 to 1000 nm, and wherein thickness ($d_2$) of the (Continued)

second layer (2) ranges from 30 to 100 nm and refractive index ($n_2$) of said second layer (2) satisfies the relation $1.25 < n_2 < 1.5$ within the wavelength range of 375 to 1000 nm, and wherein $n_1 < n_2$ also holds.

13 Claims, 6 Drawing Sheets

(51) Int. Cl.
    *C09D 5/00* (2006.01)
    *C03C 17/00* (2006.01)
    *C08J 7/04* (2020.01)
    *F21V 3/10* (2018.01)

(52) U.S. Cl.
    CPC ...... *C03C 17/005* (2013.01); *C03C 2217/734* (2013.01); *C03C 2218/111* (2013.01); *C03C 2218/113* (2013.01); *C03C 2218/365* (2013.01); *C08J 7/04* (2013.01); *C08J 2369/00* (2013.01); *C09D 5/00* (2013.01); *C09D 5/006* (2013.01); *F21V 3/10* (2018.02)

(58) Field of Classification Search
    CPC ...... G02B 1/0278; G02B 1/18; G02B 5/0242; G02F 1/133502; G02F 1/13338; G02F 1/133528; G02F 1/133512; G02F 1/38; G02F 1/133504; G02F 1/133526; G02F 2001/133331; G02F 2201/50; B82Y 20/00; C08L 33/08; C08L 71/02; C08L 63/00
    USPC .......................................................... 359/601
    See application file for complete search history.

(56) References Cited

FOREIGN PATENT DOCUMENTS

| | | |
|---|---|---|
| EP | 0119331 | 9/1984 |
| EP | 1785458 | 5/2007 |
| EP | 2130878 | 12/2009 |
| EP | 2565034 | 3/2013 |
| EP | 2757134 | 7/2014 |
| EP | 2939987 | 11/2015 |
| WO | 9960034 | 11/1999 |
| WO | 2008120782 | 10/2008 |
| WO | 2009035874 | 3/2009 |
| WO | 2010085764 | 7/2010 |
| WO | 2014061606 | 4/2014 |
| WO | 2015008556 | 1/2015 |

OTHER PUBLICATIONS

Detrich, A, et al.; entitled "Nanostructured an-tireflective bilayers: Optical design and preparation" (see Material Chemistry and Physics 145 (2014) pp. 176 to 185).
International Search Report for PCT/HU2017/050023 dated Sep. 2, 2018.
Written Opinion of the International Searching Authority for PCT/HU2017/050023 dated Sep. 2, 2018.

* cited by examiner

ANTIREFLECTION FILM AND ITS USE ON A SUBSTRATE

CROSS REFERENCE TO RELATED APPLICATIONS

This patent application is the national phase of PCT/HU2017/050023 filed Jun. 15, 2017, which claims the benefit of Hungarian Patent Application No. P1600384 filed Jun. 15, 2016.

TECHNICAL FIELD

The present invention relates to an antireflection film/coating, as well as the use thereof on a substrate to decrease a fracture of light striking the substrate reflected by said substrate, wherein said coating is formed of a transparent first layer applied on the substrate and a trans-parent second layer arranged over said first layer.

BACKGROUND

It is a well-known fact, that antireflection coatings are capable of decreasing the fraction of light reflected by surfaces. Waves reflecting from upper and lower parts of thin layers applied on surfaces can partially or fully suppress or amplify each other depending on the relative phase between and the amplitude ratio of the wave reflected by the lower surface and the wave reflected by the upper surface when the two waves meet. By suitably choosing the refractive index and the layer thickness, it can be achieved that the waves reflected by the upper surface and the lower surface have got the same amplitude but are in reversed phase upon meeting; in such cases the phenomenon of extinction or destructive interference appears. Here, the condition of full extinction ideally satisfies for a single wavelength and a single angle of incidence. An extinction condition that maintains for a broader range of wavelengths and angles of incidence will result in reflection that growingly increases. The simplest antireflection coatings of this kind are the one-layer antireflection coatings. A characteristic feature of such coatings is that the value of their refractive index is ideally equal to the geometrical average of the refractive indices of the substrate and the surrounding environment, while their thickness —again in an idealized case and for perpendicular incidence—is one quarter of a wavelength chosen from the range of wavelengths.

The application of a two-layer antireflection coating instead of said one-layer one ensures an antireflection effect that works better even in broader ranges of wavelengths and angles of incidence. By suitably choosing the number of layers, as well as the refractive index and thickness of each individual layer, the operation of antireflection coatings can be optimized. This is exemplified in EP-2,757,134 A2. However, the formation of multi-layer structures, despite their advantages beyond doubt, always involves higher costs and an increase in the number of technological steps to be performed when compared with the preparation of simpler structures.

In most antireflection structures used nowadays, the refractive indices of the layers applied on the substrate gradually decrease towards the outer environment, and partially or fully satisfy the condition according to which the refractive index of a sandwiched layer is practically a geometrical average of the refractive indices of the sandwiching layers. Such considerations are discussed inter alia in EP-0,119,331 A1, EP-2,130,878 or WO 99/60034, as well as in a publication by the authors Á. Detrich, N. Nagy, M. Nyári, E. Albert, D. Zámbó, Z. Hórvölgyi entitled to "Nanostructured antireflective bilayers: Optical design and preparation" (see Material Chemistry and Physics 145 (2014) pp. 176 to 185).

In certain cases, typically for substrates with high refractive indices, the order of the applied layers is reversed: a lower layer with a lower refractive index is directly applied on the substrate, and an upper layer is arranged on said lower layer, wherein the refractive index of the upper layer is higher than that of the lower layer. Refractive indices of the applied layers are relatively high; typically, the refractive index $n_1$ of the lower layer is larger than 1.45 (that is, $n_1 > 1.45$) and the refractive index $n_2$ of the upper layer is larger than 2.0 (that is, $n_2 > 2.0$). Such layer constructions exhibit an antireflection effect only when applied on substrates with high refractive indices, i.e. when the refractive index of the substrate used therewith is larger than 2.5 (that is, $n_{substrate} > 2.5$). Moreover, the preparation of such layer constructions requires at least two technological steps.

CN 102222704 A discloses a three-layer antireflection coating formed on a substrate of crystalline silicon with high refractive index ($n_{si} \approx 3.88$), wherein a first layer formed directly on the substrate has a layer thickness in the range of 20 to 30 nm and a refractive index $n_1$ satisfying the relation $1.15 < n_1 < 1.25$ when measured in the visible range of wavelengths, and a second layer formed over the first layer has a layer thickness in the range of 80 to 90 nm and a refractive index $n_2$ satisfying the relation $1.30 < n_2 < 1.45$ when measured in the visible range of wavelengths, and a third layer formed over the second layer has a layer thickness in the range of 50 to 60 nm and a refractive index $n_3$ satisfying the relation $2.12 < n_3 < 2.28$ when measured in the visible range of wavelengths, and wherein the relation $n_1 < n_2 < n_3$ also holds for any wavelength of an incident light in the visible range of wavelengths that strikes said coating. Preparation of said three-layer coating takes place in three technological steps.

SUMMARY

The object of the present invention is to form two-layer antireflection coatings on substrates with low refractive indices ($n_{substrate} < 2.5$), wherein the inventive coatings have got a structure and a refractive index both differing from the structure and the refractive index, respectively, of the antireflection coatings used at present, and wherein the application of an inventive coating on a substrate decreases the fraction of light reflected by the substrate thus coated and/or increases the transmission of light in the case of substrates transparent at least in the visible range of wavelengths.

The invention relates to, in the most general aspect, in harmony with claim 1, a two-layer antireflection coating that consists of a transparent first layer applied on a substrate and a transparent second layer over the first layer, wherein thickness $d_1$ of the first layer ranges from 10 to 70 nm and refractive index $n_1$ of said first layer satisfies the relation $1.05 < n_1 < 1.35$ within the wavelength range of 375 to 1000 nm, and thickness $d_2$ of the second layer ranges from 30 to 100 nm and refractive index $n_2$ of said second layer satisfies the relation $1.25 < n_2 < 1.5$ within the wavelength range of 375 to 1000 nm, and wherein $n_1 < n_2$. Possible further preferred embodiments of the antireflection coating according to the invention are set forth in claims 2 to 6 and claim 12.

The invention also relates to a use of an antireflection coating on a substrate with low refractive index, in harmony with claim 7, to decrease the fraction of light striking the substrate reflected by said substrate. Possible further preferred variants are defined in claims 8 to 12.

BRIEF DESCRIPTION OF THE DRAWINGS

The invention is now discussed in detail with reference to the drawings, some preferred embodiment structures and measuring data obtained in measurements performed on these structures, wherein.

In the drawings, identical layers are designated with the same reference numerals.

DETAILED DESCRIPTION

Figure 1:
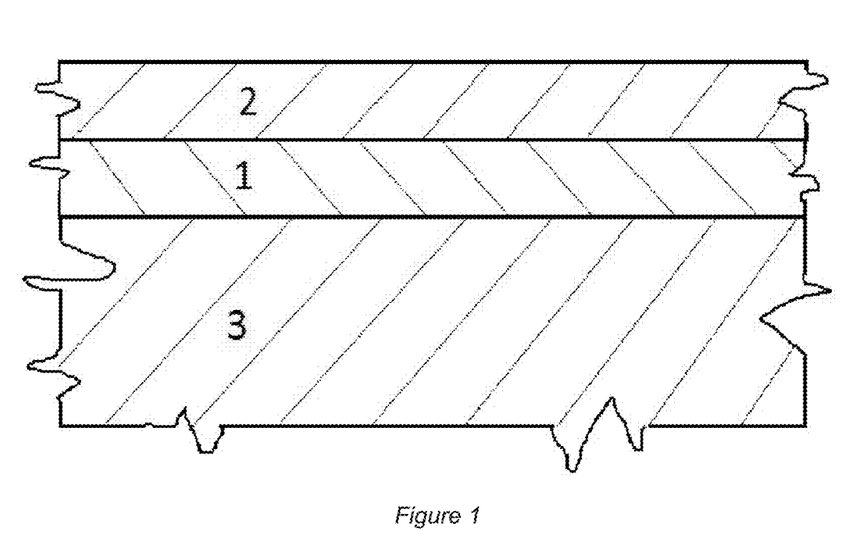
FIG. 1 illustrates the layer structure of a two-layer antireflection coating according to the present invention formed on a non-transparent substrate.

FIG. 1 illustrates a two-layer antireflection coating applied on a side surface of a substrate 3 of arbitrary shape made of a substance with refractive index $n_{substrate}$, wherein said coating consists of a transparent first layer 1 with thickness $d_1$ and refractive index $n_1$, and a transparent second layer 2 with thickness $d_2$ and refractive index $n_2$ over the first layer. In accordance with the present invention the thicknesses and the refractive indices of the first and second layers 1, 2 satisfy the following conditions:

thickness $d_1$ of said first layer 1 ranges from 10 to 70 nm and the refractive index $n_1$ satisfies the relation $1.05 < n_1 < 1.35$ within the wavelength range of 375 to 1000 nm;

thickness $d_2$ of said second layer 2 ranges from 30 to 100 nm and the refractive index $n_2$ satisfies the relation $1.25 < n_1 < 1.5$ within the wavelength range of 375 to 1000 nm; and $n_1 < n_2$.

Such a two-layer antireflection coating can be formed on the substrate 3 through e.g. the so-called "sol-gel" technique known in literature, preferably by means of a dip coating technology and then by conditioning the obtained coating under suitable conditions; basic details of the procedure can be known from e.g. EP-2,939,987 A1, and Chapter 10 "Dip Coating" by C. Jeffrey Brinker included in the textbook of *Chemical Solution Deposition of Functional Oxide Thin Films* (editors: T. Schneller, R. Weser, M. Kosec, D. Payne; publisher: Springer Vienna; published in 2013; ISBN 978-3-211-99310-1).

Figure 2:
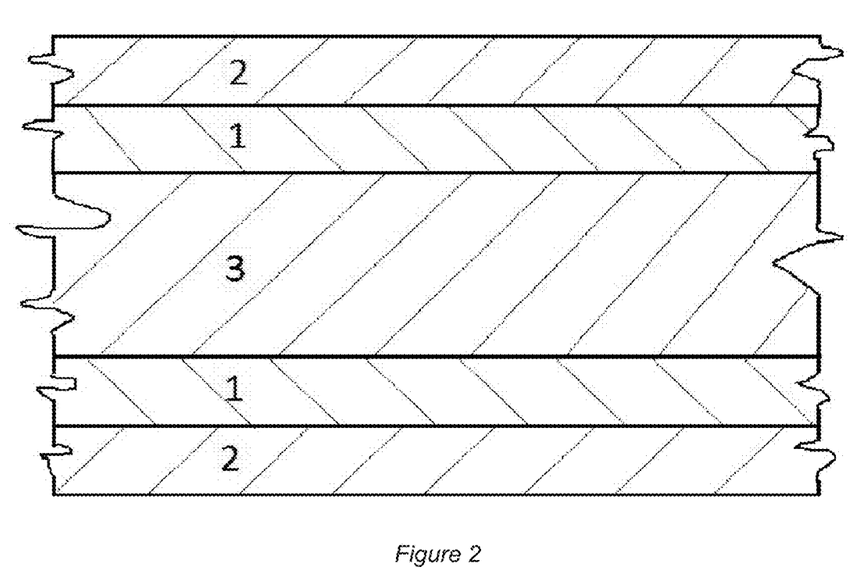
FIG. 2 illustrates the layer structure of a two-layer antireflection coating according to the present invention formed on a transparent substrate.

FIG. 2 illustrates a similar structure on a substrate 3 that is transparent at least within the wavelength range of visible light. Here, the first and second layers 1, 2 are equally applied on both side surfaces of the transparent substrate 3. Transparency of the substrate 3 is important here as light can strike the substrate 3 from both sides and reflection can be reduced in both directions in this case. Actually, transmittance, that is, the ability of the substrate to transmit light improves here.

Figure 3:
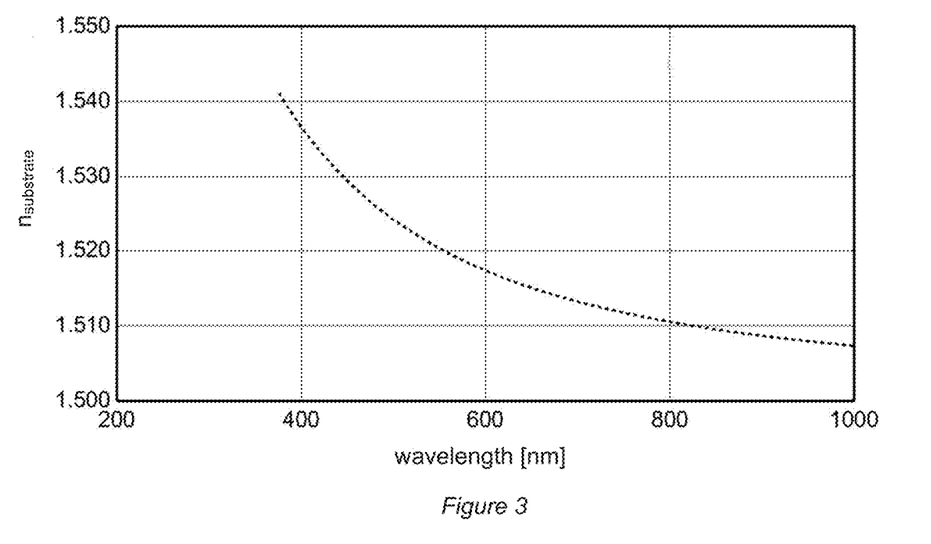
FIG. 3 shows wavelength dependence of the refractive index of the transparent substrate made of glass.

FIG. 3 shows the refractive index nsubstrate of the transparent substrate 3 made of glass as a function of the wavelength of the incident light. Here and from now, the term "glass" refers to a glass substance that is permeable to light traditionally at least in a range of the electromagnetic spectrum corresponding to visible light and thus is transparent.

Figure 4:
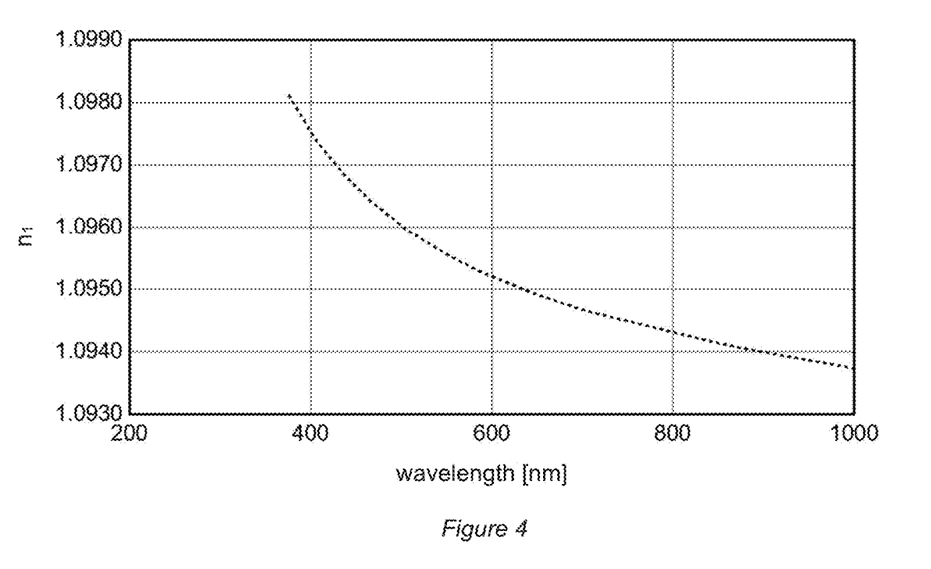
FIG. 4 shows wavelength dependence of the refractive index of the lower (first) layer of a two-layer antireflection coating according to the invention formed on the glass substrate.
Figure 5:
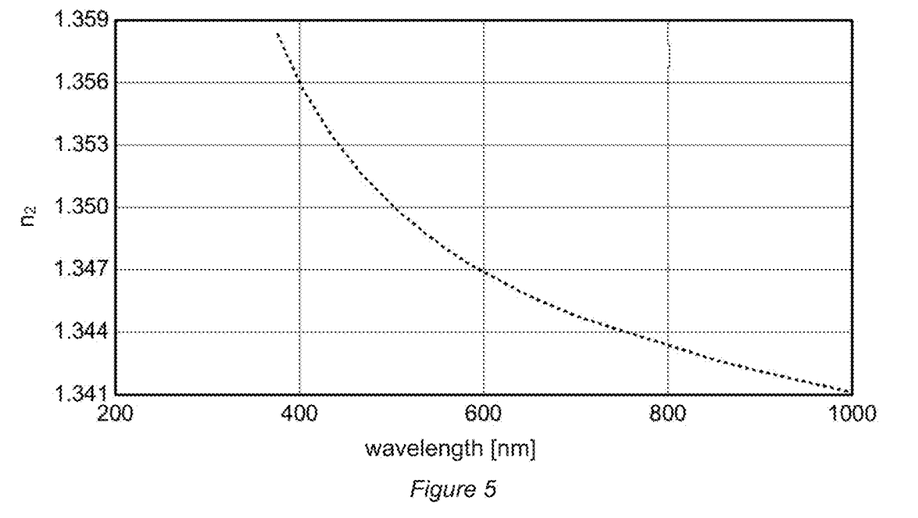
FIG. 5 shows wavelength dependence of the refractive index of the upper (second) layer of a two-layer antireflection coating according to the invention formed on the glass substrate.

In FIG. 4, the refractive index of the first layer 1 of an antireflection coating arranged on the substrate 3 is illustrated in a similar plot, wherein said antireflection coating corresponds to the structure according to FIG. 2 and has been applied on both side surfaces of the substrate 3. Moreover, in FIG. 5, the refractive index of the second layer 2 of the same structure can be seen. In case of the specimen studied and measured, the layer thicknesses are as follows: for the first layer 1, thickness $d_1$ is equal to 25±5 nm, i.e. $d_1$=25±5 nm, and for the second layer 2, thickness $d_2$ is equal to 65±3 nm, i.e. $d_2$=65±3 nm. According to further experiments performed, the substrate 3 can be made of a quartz glass as well, instead of ordinary glasses.

Figure 6:
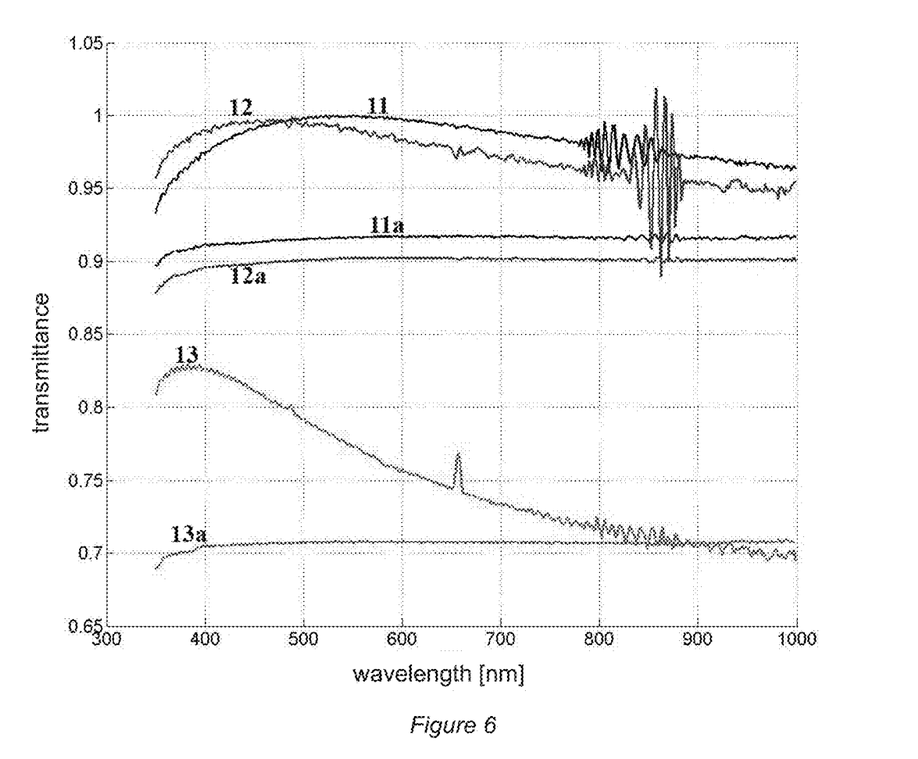
FIG. 6 shows transmittances measured at various angles of incidence for the glass substrate with and without (curves with "a") the antireflection coating.

FIG. 6 shows the transmittance as measured for the structure of FIG. 2 as a function of the wavelength of the incident light. Here, curves 11, 12 and 13 represent the transmittance of said structure measured at the angles of incidence 0°, 40° and 70°, respectively; the curves also designated by an index "a", that is, curves 11a, 12a and 13a show the transmittance of the substrate without the antireflection coating. One can read from said curves that the maximum of the transmittance shifts towards the range of smaller wavelength as the angle of incidence increases. For substrates 3 made of glass/quartz glass, the transmittance of the layers prepared with the above discussed parameters is higher than 70% everywhere within the wavelength range of 375 to 1000 nm and the range of angles of incidence of 0° to 70°. It can also be seen from FIG. 6 that, as a consequence of the application of an antireflection coating according to the present invention, the light transmission of a substrate made of glass improves in a broad range of angles of incidence, practically over the whole range of 0° to 70° , compared to that of a substrate without an antireflection coating according to the invention.

Figure 7:
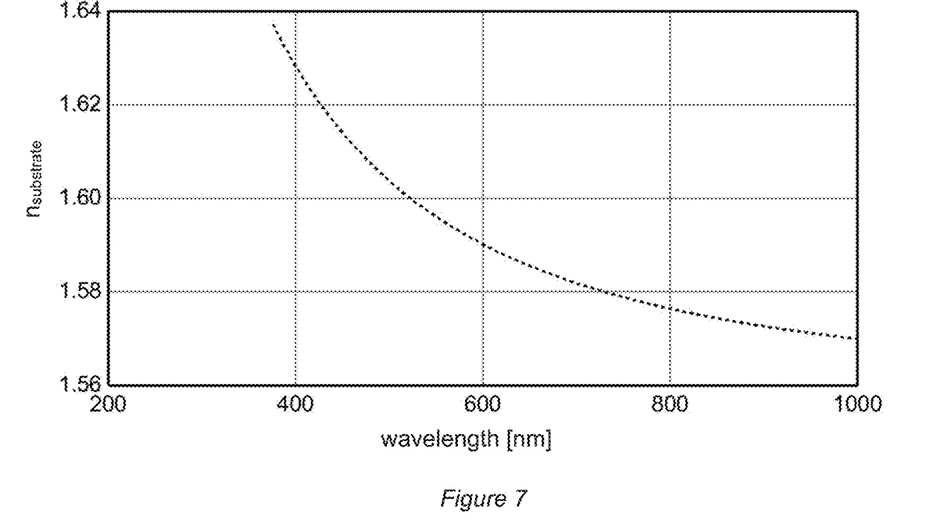
FIG. 7 shows wavelength dependence of the refractive index of a polycarbonate substrate.
Figure 8:
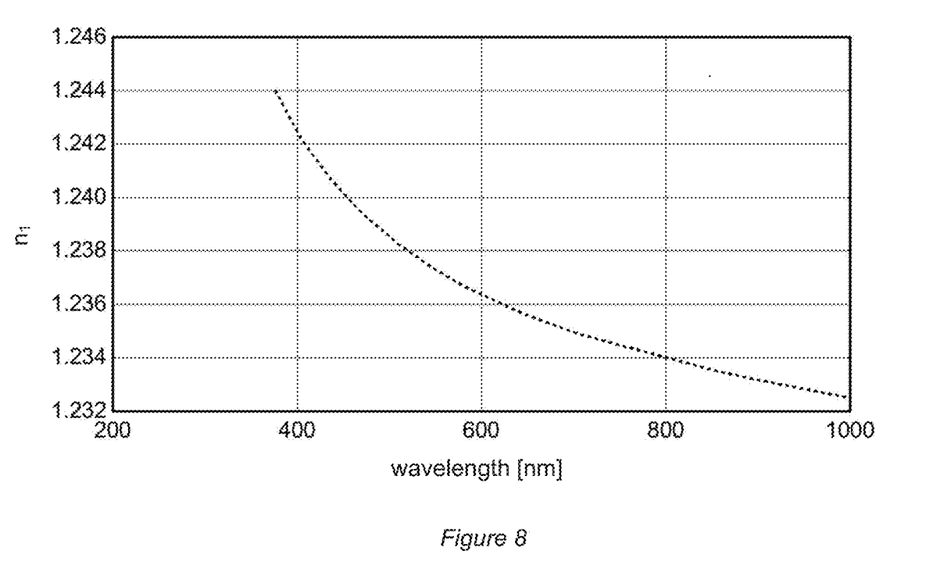
FIG. 8 shows wavelength dependence of the refractive index of the lower (first) layer of a two-layer antireflection coating according to the invention formed on said polycarbonate substrate.
Figure 9:
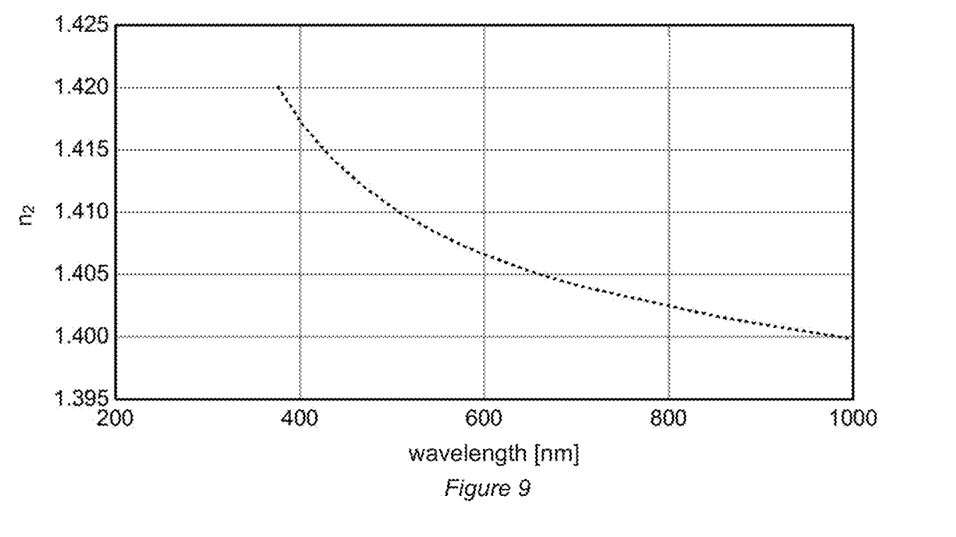
FIG. 9 shows wavelength dependence of the refractive index of the upper (second) layer of a two-layer antireflection coating according to the invention formed on said polycarbonate substrate.

In FIG. 7, refractive index of a substrate 3 made of polycarbonate is illustrated. Here, the layer structure is identical to the one shown in FIG. 2. Wavelength dependencies of the refractive indices of transparent first and second layers 1, 2 of the antireflection coating applied on both side surfaces of the substrate 3 are shown in FIGS. 8 and 9. In this case, thickness $d_1$ of said first layer 1 is equal to 50±4 nm, i.e. $d_1$=50±4 nm, and thickness $d_2$ of said second layer 2 equals 35±3 nm, i.e. $d_2$=35±3 nm holds.

Figure 10:
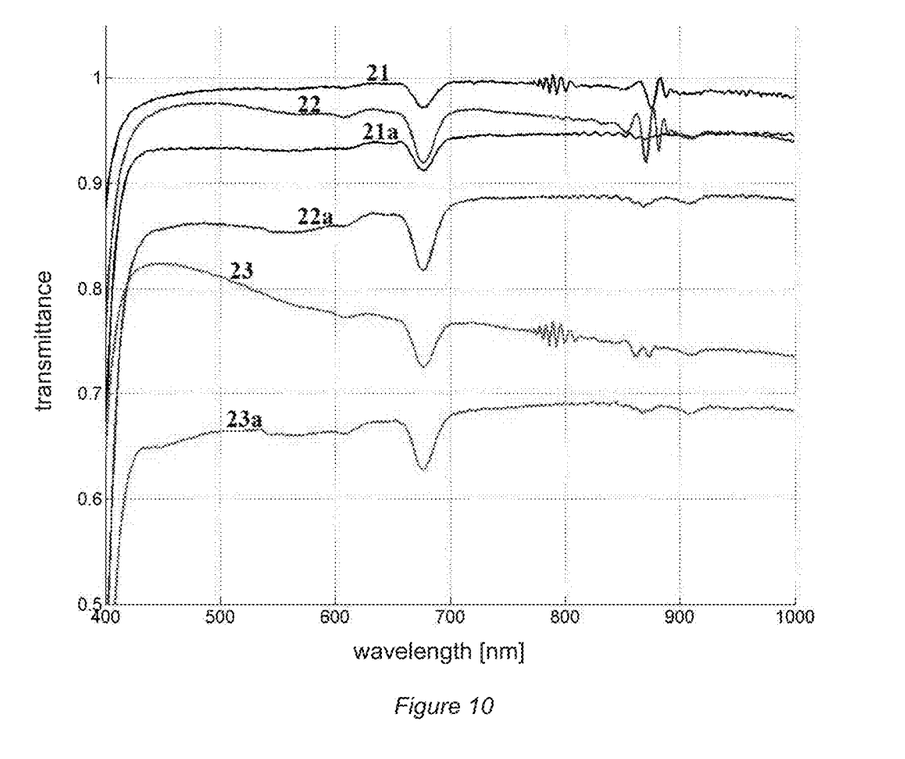
FIG. 10 shows transmittances measured at various angles of incidence for the polycarbonate substrate with and without (curves with "a") the antireflection coating; and finally

FIG. 10 is similar to FIG. 6 discussed above but for a layer structure formed on the polycarbonate substrate 3. Curves 21, 22 and 23 represent respective transmittances at angles of incidence of 0°, 40° and 70°, respectively; the curves also designated by an index "a", that is, curves 21*a*, 22*a* and 23*a* show the transmittance of the polycarbonate substrate without the antireflection coating. For the polycarbonate substrate, the transmittance of the layers prepared with the above discussed parameters is higher than 73% everywhere within the wavelength range of 400 to 1000 nm and the range of angles of incidence of 0° to 70°.

Figure 11:
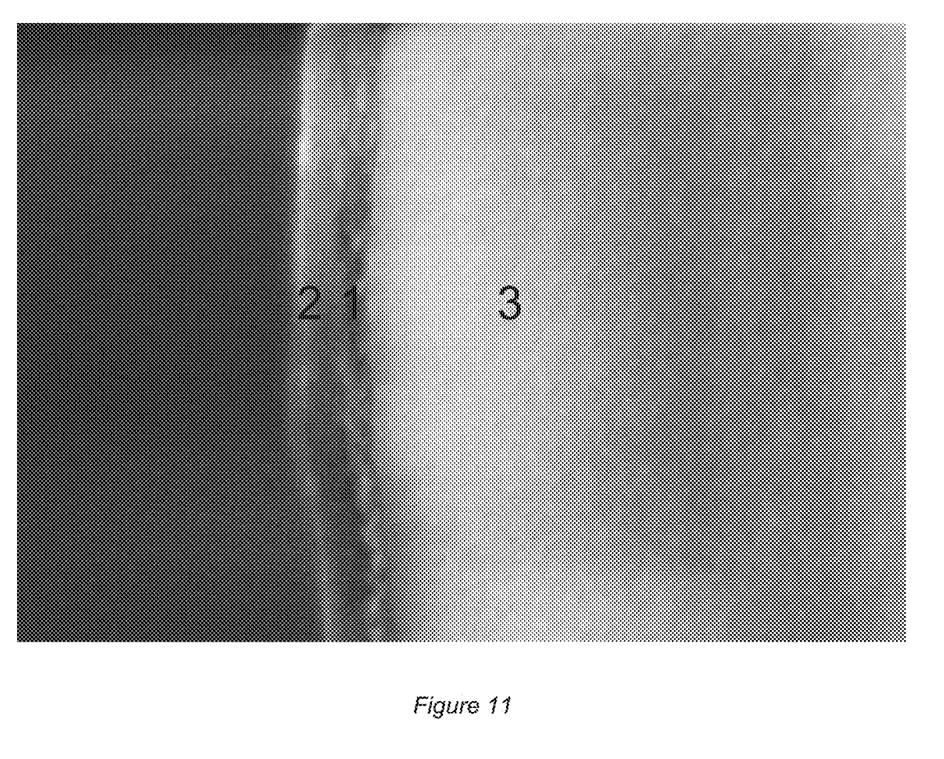
FIG. 11 is a scanning electron (SEM) micrograph of the layer structure of the antireflection coating according to the present invention formed on a glass substrate.

FIG. 11 is a micrograph of the layer structure shown in FIG. 1 taken by a scanning electron microscope (type: Leo 1540 XD with JSM-26 analogue electronics, traditional electron optics and digital image recording; distributor: Zeiss) at a magnification of 300000×. One can readily see from said micrograph that the antireflection coating according to the invention applied on the substrate 3 is provided by a two-layer layer structure that consists of the first layer 1 and the second layer 2, wherein the two layers are of different optical properties.

According to our studies, it might also occur that the first layer 1 is formed by a combination of several sublayers, wherein the total thickness of said combination of sublayers corresponds to the thickness $d_1$ of the first layer 1, the refractive indices of said sublayers of the combination preferably increase as progressing away from the substrate 3, and all the refractive indices of the sublayers are within the range of refractive indices set for the refractive index $n_1$ of the first layer 1 in the above-referred first embodiment of the antireflection coating according to the invention.

Alternatively, according to our studies, it might also occur that said second layer 2 is formed by a combination of several sublayers, wherein the total thickness of said combination of sublayers corresponds to the thickness $d_2$ of the second layer 2, the refractive indices of said sublayers of the combination preferably increase as progressing away from the substrate 3, and all the refractive indices of the sublayers are within the range of refractive indices set for the refractive index $n_2$ of the second layer 2 in the above-referred first embodiment of the antireflection coating according to the invention.

The substrate 3, optionally, may form the envelope of a light emitting device or a part thereof. In such a case, the decrease in the amount of light being generated inside said envelope reflected by the internal surface of the envelope leads to an increase in the luminous efficiency. In a possible further case, the substrate 3 may form an optical lens, including all kinds of imaging and other non-imaging lenses as well. For a skilled artisan, advantages of the usage of an antireflection coating according to the present invention (such as e.g. higher light transmission rates, images with higher contrast, easier recordability due to the greater amount of light passed through, etc.) are evident.

The invention claimed is:

1. An antireflection coating comprising:
   a transparent first layer (1) applied on a substrate (3) of low refractive index ($n_{substrate}$); and
   a transparent second layer (2) over the first layer (1),
   wherein thickness ($d_1$) of the first layer (1) ranges from 10 to 70 nm and refractive index ($n_1$) of said first layer (1) satisfies $1.05<n_1<1.35$ within an entire wavelength range of 375 to 1000 nm, and
   wherein thickness ($d_2$) of the second layer (2) ranges from 30 to 100 nm and refractive index ($n_2$) of said second layer (2) satisfies $1.25<n_2<1.5$ within the entire wavelength range of 375 to 1000 nm, and
   wherein $n_1<n_2$.

2. The antireflection coating according to claim 1, wherein the substrate (3) for the antireflection coating is transparent within the wavelength range of 375 to 1000 nm.

3. The antireflection coating according to claim 2, wherein the antireflection coating is formed on both side surfaces of the substrate (3).

4. The antireflection coating according to claim 2, wherein the substrate (3) forms an envelope or at least a part of an envelope of a light emitting device.

5. The antireflection coating according to claim 2, wherein the substrate (3) is an optical lens.

6. The antireflection coating according to claim 1, wherein the low refractive index ($n_{substrate}$) of said substrate (3) satisfies $n_{substrate}<2.5$.

7. The antireflection coating according to claim 1, wherein said substrate (3) is made of at least one substance chosen from the group consisting of glass, quartz glass and polycarbonate.

8. A method comprising using an antireflection coating on a substrate (3) to decrease a fraction of light striking the substrate (3) reflected by said substrate (3), wherein refractive index ($n_{substrate}$) of the substrate (3) satisfies $n_{substrate}<2.5$, and wherein said antireflection coating applied on said substrate (3) is formed of a first layer (1) and a second layer (2) over the first layer (1), wherein thickness ($d_1$) of the first layer (1) ranges from 10 to 70 nm and refractive index ($n_1$) of said first layer (1) satisfies $1.05<n_1<1.35$ within a wavelength range of 375 to 1000 nm, and wherein thickness ($d_2$) of the second layer (2) ranges from 30 to 100 nm and refractive index ($n_2$) of said second layer (2) satisfies $1.25<n_2<1.5$ within the wavelength range of 375 to 1000 nm, and wherein $n_1<n_2$.

9. The method according to claim 8, further comprising the antireflection coating decreasing the fraction of light striking the substrate reflected by said substrate (3) in a broad range of wavelengths.

10. The method according to claim 9, wherein said broad range of wavelengths ranges from about 400 nm to about 900 nm.

11. The method according to claim 8, further comprising the antireflection coating decreasing the fraction of light striking the substrate reflected by said substrate (3) in a broad range of angles of incidence.

12. The method according to claim 11, wherein said broad range of angles of incidence ranges from about 0° to about 70°.

13. The method of claim 8, wherein said substrate (3) is made of at least one substance chosen from the group consisting of glass, quartz glass and polycarbonate.

* * * * *